United States Patent [19]

Leonard

[11] Patent Number: 4,589,892

[45] Date of Patent: May 20, 1986

[54] SEQUENCED MODULAR BED CAROUSEL DEHUMIDIFIER

[75] Inventor: David M. Leonard, Sunbury, Ohio

[73] Assignee: Bry-Air, Inc., Sunbury, Ohio

[21] Appl. No.: 682,013

[22] Filed: Dec. 6, 1984

Related U.S. Application Data

[63] Continuation of Ser. No. 482,945, Apr. 7, 1983, abandoned.

[51] Int. Cl.$^4$ .............................................. B01D 53/06
[52] U.S. Cl. ...................................... 55/162; 55/181; 55/208; 55/390
[58] Field of Search ......... 55/34, 60, 77, 78, 179–181, 55/390, 474, 161–163, 208

[56] References Cited

U.S. PATENT DOCUMENTS

| | | | |
|---|---|---|---|
| 1,590,266 | 6/1926 | Tiedtke et al. | 55/390 X |
| 2,053,159 | 9/1936 | Miller | 55/179 |
| 2,266,219 | 12/1941 | Larriva | 55/34 X |
| 2,286,920 | 6/1942 | Miller | 55/179 |
| 2,507,607 | 5/1950 | Miller | 55/179 |
| 2,541,694 | 2/1951 | Galson | 55/179 |
| 2,639,000 | 5/1953 | Edwards | 55/179 |
| 2,662,607 | 12/1953 | Moragne | 55/179 |
| 3,197,944 | 8/1965 | Westeren et al. | 55/179 X |
| 3,246,961 | 4/1966 | Karlsson | 55/78 X |
| 3,487,608 | 1/1970 | Graff | 55/179 X |
| 3,757,492 | 9/1973 | Graff | 55/181 |
| 4,238,209 | 12/1980 | LaPointe | 55/181 |

FOREIGN PATENT DOCUMENTS

| | | | |
|---|---|---|---|
| 453470 | 12/1948 | Canada | 55/179 |
| 1011378 | 6/1952 | France | 55/179 |
| 28260 | 8/1978 | Japan | 55/390 |
| 146274 | 11/1979 | Japan | 55/181 |

Primary Examiner—Robert Spitzer
Attorney, Agent, or Firm—Porter, Wright, Morris & Arthur

[57] ABSTRACT

A dehumidifying apparatus including a carousel ring with a plurality of axial modular desiccant beds, separated from each other, in which the modular beds are cyclically shifted from the process to the regenerating to the process conditions as the carousel ring rotates about a central axis.

12 Claims, 19 Drawing Figures

FIG. 6B ly available dehumidifier includes a circular desiccant filled bed in which a thickness of desiccant is covered on each side with circular perforated sheet steel disks to permit controlled air passage through the bed in which one section is utilized for drying process air and another section is used for reactivation of the desiccant after the predetermined time limit of a cycle is reached. Such circular beds are enclosed in a manner in which sections of the same bed are compartmentally divided by an enclosure. The circular desiccant beds are rotated continuously through the compartments which are isolated from each other by dividing means which generally use silastic or other pliable seals in contact with the bed. One compartment, accessible to a principal segment of the bed, dehumidifies the process air and delivers a continuous, uninterrupted supply of dry air to the area or process requiring it. In the other compartment, a portion of the desiccant bed is regenerated by an application of heated air and made ready for reuse. Thus, the desiccant in the circular bed is continuously used, and then reactivated, as the thick, circular bed rotates to present different portions of the bed, respectively to the compartments of the enclosure intended for process air and the reactivating stage.

SEQUENCED MODULAR BED CAROUSEL DEHUMIDIFIER

RELATED APPLICATIONS

This is a continuation of my co-pending application Ser. No. 482,945, filed Apr. 7, 1983, now abandoned.

FIELD OF THE INVENTION

This invention relates to air dehumidifying systems which, by the process of physical adsorption, produce a controlled humidity environment for a predetermined enclosed volume.

BACKGROUND OF THE PRIOR ART

Dehumidifying systems to produce a controlled humidity environment in an enclosed volume have found applications in industrial processing, product drying, material storage and comfort air conditioning. Typical apparatus and methods which are employed in such systems involve a physical adsorption process in which moisture is removed from air by the use of a desiccant, such as a silica gel or other hydrophylic material.

When a desiccant is utilized, ambient air is directed through a desiccant bed in which the desiccant medium adsorbs moisture (water vapor), typically up to 40% of the weight of the desiccant, depending upon the desiccant employed. After a predetermined time period, the adsorption limit for the desiccant approaches a design limit, and the desiccant is reactivated by the application of heated air to dry the bed. After reactivation, the same desiccant is reused for adsorption. The process of adsorption by, and reactivation of, the desiccant is cyclically repeated.

One type of commercially available dehumidifier includes a circular desiccant filled bed in which a thickness of desiccant is covered on each side with circular perforated sheet steel disks to permit controlled air passage through the bed in which one section is utilized for drying process air and another section is used for reactivation of the desiccant after the predetermined time limit of a cycle is reached. Such circular beds are enclosed in a manner in which sections of the same bed are compartmentally divided by an enclosure. The circular desiccant beds are rotated continuously through the compartments which are isolated from each other by dividing means which generally use silastic or other pliable seals in contact with the bed. One compartment, accessible to a principal segment of the bed, dehumidifies the process air and delivers a continuous, uninterrupted supply of dry air to the area or process requiring it. In the other compartment, a portion of the desiccant bed is regenerated by an application of heated air and made ready for reuse. Thus, the desiccant in the circular bed is continuously used, and then reactivated, as the thick, circular bed rotates to present different portions of the bed, respectively to the compartments of the enclosure intended for process air and the reactivating stage.

A problem encountered in a circular bed system is that sections of the desiccant bed cannot be absolutely isolated with respect to a section in process use and a section subjected to heated reactivating air flow. Further, co-mingling of currents of air being conditioned and the heated reactivating air may occur in the bed or at the compartmental seal between bed sections—resulting in mixture of the two air flows. This occurs because the conventional design requires co-current air flow (i.e., in the same direction) of the process and reactivating air stream or because of incidental or design imbalances between the two air streams. In addition, in a circular bed dryer, the sections are not separated and air moves horizontally through the bed sections. Also, pliable seals which separate the compartments with respect to the bed are subjected to contact with the circular perforated surface of the bed enclosure disks and abrasion of the seal may result. In addition, the desiccant itself may leach through the perforated disks of the bed, causing further abrasion problems with respect to the seal gasket and the circular bed movement with respect thereto.

An inherent inefficiency in a co-current adsorber system is that, depending upon the thickness of the desiccant bed, moisture may tend to concentrate on the one side of the bed which is first subjected to process air flow as the air is directed through the thickness of the desiccant within the bed. In the reactivation stage in a co-current system, the concentrated moisture on the one side must also be "driven" through the thickness of the bed desiccant before complete drying occurs. Similarly, heat of reactivation also tends to concentrate on the one side of the bed, and in cooling the bed after reactivation, before the desiccant reaches an optimum efficiency, heat concentrated on one side after bed, similarly is driven through the bed thickness. The degree of inefficiency encountered in driving moisture through the bed thickness in the drying stage and in driving heat through the bed in the cooling stage is, of course, dependent upon operating parameters such as bed thickness, conductivity, air flow rates and the like which will be evident to those of skill in the art; however, as the size and capacity of a desiccant bed dehumidifying unit increases, these factors begin more importantly to affect operating efficiency and cost.

In addition, various drum and/or chambered apparatus are also known to be useful in air drying dehumidifying units. For example, U.S. Pat. No. 3,487,608, Roderick W. Graff, "Method and Apparatus for Adsorption of Molecules from Fluids," issued Jan. 6, 1970, describes an adsorption apparatus using multiple separate chambers filled with adsorbent material, which are cyclically utilized for adsorption and then subjected to regeneration. The chambers may be rotatably disposed to provide respective operative engagement to an adsorbing function and a regenerating function in a cyclical manner between different chambers. Also, a rotatable drum has also been employed in an adsorbent system in which an annular drum is divided by partitions into a number of compartments which are cyclically subjected to processing and regeneration. See: U.S. Pat. No. 3,639,000 W. E. Edwards, "Rotating Bed Absorber," issued May 19, 1953.

OBJECTS OF THE INVENTION

It is an object of this invention to provide a rotating bed adsorber in an industrial dehumidifier desiccant system, in which a plurality of separate desiccant chambers are cyclically rotated in a carousel formed from a plurality of separate, modular beds, between a first air drying fluid stream (process air) and a second regenerating fluid stream. In this regard, it is an object to provide positive sealing of the chambers and the isolation of a predetermined chamber with respect to a first adsorption and a second regeneration air stream. The air streams are effectively segregated from each other within the unit structure by a compartmental isolation means as well as by divider means which separate the modular desiccant chambers from each other.

Further, since the air streams are isolated from each other, significantly greater control of unit performance can be achieved. The desorption or regeneration air stream flow rate can be increased to maximize the speed of desiccant regeneration, decreased to minimize energy consumption, or otherwise adapted to specific design parameters suitable for a predetermined application. In addition, it is an object to provide a desiccant apparatus in which various desiccant bed thicknesses may be incorporated without modification to the placement or configuration of the carousel package. It is also an object to provide the chamber sealing elements in connection with the isolation means. Further, the separation of the modular desiccant bed permits a countercurrent air flow through the beds with respect to process and regeneration air flow. Depending on bed thickness, operating efficiencies in energy usage may be achieved since it is not necessary that concentrated moisture and/or heat be driven through the bed thickness as is necessary in co-current flow systems.

Thus, it is an object to provide a modular vertical bed in a dehumidifying unit which is capable of incorporating a greater volume of dessicant in an apparatus of given (volumetric) size than is generally possible with the traditional concentric screen drum design. Service is simplified with the modular chambers; the bed may be disassembled in sections to facilitate service in limited access installations.

Also, in such a system it is an object of the invention rapidly to move, in a cyclical manner, the modular beds from the process to the regeneration compartments of the unit and rapidly to return the regenerated bed to process the in the cycle. Also it is an object to provide a secure and reliable engagement means for the carousel bed rotation, whereby at predetermined, temporal design intervals, the modular bed sections may be rotatably disposed with respect to an axis of rotation; and it is a further object to provide a linear actuator means for positively engaging and shifting the modular carousel beds with respect to process and regeneration air flow.

These and other objects of the invention may be more fully explained by reference to the drawings and the following description of the preferred embodiment.

DESCRIPTION OF THE PREFERRED EMBODIMENT

Generally, the apparatus of the invention includes a plurality of essentially identical modular desiccant beds. Each bed is a container for a desiccant medium and has a pair of essentially parallel permeable sides which permit the flow of air from one side of the bed to another side through the desiccant. The beds are installed in a ring form around a carousel having a plurality of equally spaced locations for receiving a desiccant bed. Each bed location is essentially axial with respect to the axis of rotation of the carousel, the beds being between the inner and outer circumferences of the carousel ring. Divider means are included in the carousel for operatively isolating and separating the modular desiccant beds included at the carousel locations from each other.

In the preferred embodiment, the divider means are disposed so that one permeable side of each bed is operatively disposed towards the outer circumference of the carousel and the other permeable side of the bed is operatively disposed towards the inner circumference of the carousel. Further isolation means are cooperatively engageable with the modular beds to segregate a predetermined number of modular beds on the carousel from the other beds on the carousel to provide a first class of air process beds upon the carousel in which the bed desiccant is operative and a second class of beds upon the carousel in which the bed desiccant is a regenerating condition. In this manner, a countercurrent air flow is permitted. Further, as to any individual bed, all the desiccant in the bed is either in process or in regeneration. The same enclosed volume of desiccant in an individual bed is not subjected at the same time to process and regeneration air flows as may occur in conventional units.

Thus, independent air flows are provided for process and reactivation; it is not necessary to balance process and regeneration air flows within the unit. Therefore, it is possible to adjust the reactivation air volume in order to maximize grain depression or to minimize energy consumption. Simplified removal of desiccant beds is also achieved by the modular bed. Should it be necessary, the modular bed design allows for easy removal of box. Two opposite sides of the bed 30 and 31 are formed from an air permeable medium, such as perforated sheet metal, to allow the passage of air through the bed. The remaining two sides of the bed 32 and 33 are enclosed by a solid air impermeable material, such as sheet metal. The side of the bed intended for installation facing the outer perimeter of the carousel, 32 in FIG. 3A, also includes an extending lip segment 34 along the vertical side thereof, to provide a fixed positive isolation seal with respect to the adjacent and corresponding vertical dividers on the carousel ring. The modular bed is also provided with a top opening 35 with engageable cap 35a to allow desiccant fill in the bed, and lower emptying hole 36 covered by recessed removable plate 37 to permit desiccant removal. Plate 37 is held in place by screws or other fasteners and preferably the surfaces of the plate and fasteners should not protrude beyond surface 32.

Figure 3A:
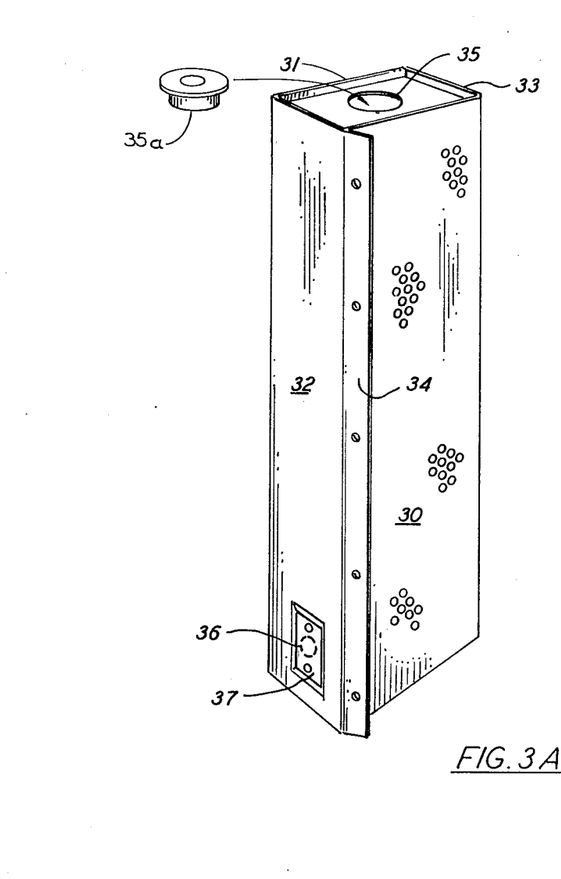
FIGS. 3A and 3B show respectively a detail of a modular vertical desiccant bed section and the relationship of the installation of the modular desiccant beds to the carousel ring.
Figure 3B:
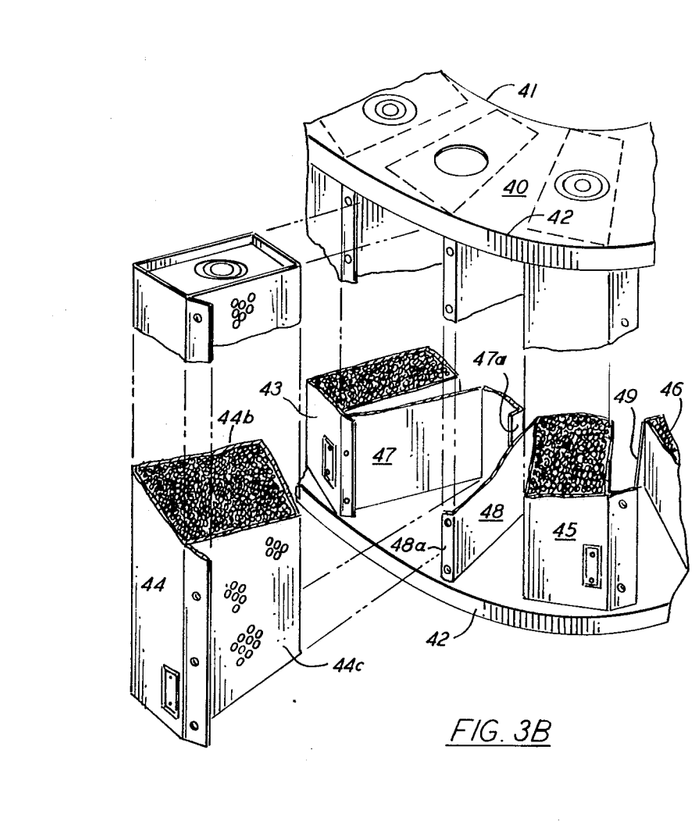

The relationship of installation of the beds to the rotatable carousel ring is shown in detail in FIG. 3B where a segment of a carousel ring 40 is shown, having inner diameter 41 and outer diameter 42. The vertical beds (or segments thereof) are shown at 43, 44, 45 and 46. Isolation dividers associated with each adjacent modular bed are shown in place at 47, 48 and 49. Modular bed 44 is shown to be receivable in the carousel ring. The "inward" facing side of the bed is engageable with an extending rear lip 47a of the adjacent carousel isolation divider 47 and the outward facing side of the bed engages the bed lip 44a with a corresponding front lip 48a on the next adjacent divider 48. It can be seen that in the relationship of the modular bed to the vertical carousel isolation dividers, two distinct volumes with respect to the bed and the carousel ring are created. A first volume, between divider 47 and one air permeable side of the bed 44b is essentially wedge shaped, isolates the adjacent desiccant beds from each other, and operatively presents one air permeable side of the bed, 44b, to the outer circumference of the carousel ring. The second volume, between the opposite side of the bed 44c and adjacent divider 48 which presents a surface essentially parallel to the air permeable side of the bed 44c forms a second volume which is operatively closed from the outer circumference of the carousel and operatively presents the other air permeable side of the bed to the inner circumference of the carousel 41. Thus is can be seen that with respect to each individual bed on the carousel ring, an isolated air passageway is created (separately for each bed) in which air flow is permitted from the outside of the carousel to the inside of the carousel (or vice versa) through the desiccant containing volume of the bed.

Figure 3C:
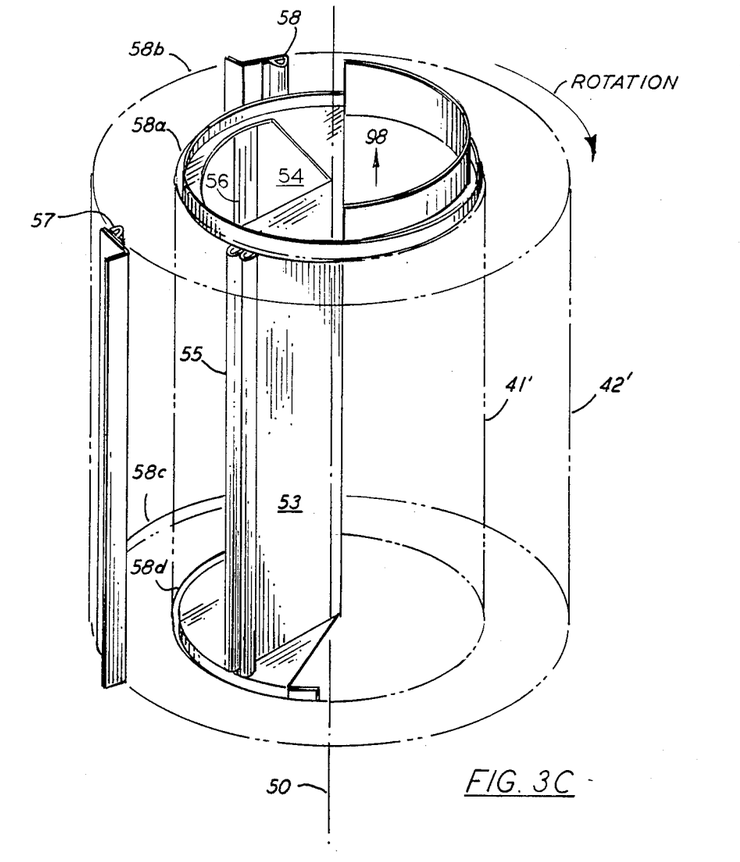
FIG. 3C shows a detail in perspective of the central isolation divider of the apparatus which separates and isolates the dehumidifying and regenerating air flows with respect to predetermined sections of the carousel; which divider means are useful with the embodiment of the carousel ring shown in FIGS. 3A and 3B.

As noted previously, the carousel ring having the plurality of modular beds disposed thereon is rotatable about a central axis on the base of the apparatus. Concentric with the axis of rotation there is provided an interior sector divider with respect to the carousel which isolates a proportion of the internal cylindrical volume enclosed by the carousel ring to separate the volume into process and regenerating sectors. A detail of a divider, useful with a carousel bed system shown in FIGS. 3A and 3B by which a quadrant of the beds is isolated is shown in FIG. 3C wherein the inner circumference of the carousel ring is shown at 41', the outer circumference of the carousel ring is shown at 42' and the center axis of the apparatus is shown at 50. Perpendicular walls 53 and 54 are vertically disposed along the height of the divider and co-extend with the height of the carousel. The walls are air impermeable and meet essentially at the center axis and extend radially from the center to the inside diameter 41 of the carousel ring. A sealing member is disposed at the circumference edges of the walls of the divider such as the gaskets shown at 55 and 56. Two peripheral sealing means such as additional gaskets shown at 57 and 58 are also perpendicularly provided at outer ring circumference 42 and are related to each other and to the beds disposed on the carousel ring to define a quadrant isolating 25% of the beds on the carousel.

Figure 3D:
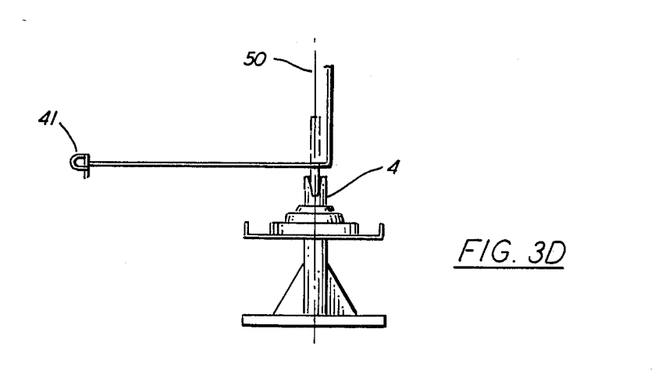
FIG. 3D shows the manner of positioning the bottom axis of the central isolation divider with respect to the base axle.

The relationship of the peripheral sealing means and the center quadrant sealing divider to the inner and outer circumference of the carousel requires that one be offset with respect to the other to accomodate air flow through the air permeable sides of the dessicant beds with respect to the section defined by the quadrant. Additional gasket means are also provided at the upper and lower locations of the sector defined by the isolation divider both at the inner and outer circumference of the ring. Such locations for gasket sealing means are indicated at 58a, 58b, 58c and 58d in FIG. 3C. The bottom section of the isolation divider may be fixed with respect to the axis of the unit by tapered engagement means with the base axle 4 such as is shown in FIG. 3D although other insertion, overlap and securing means will also be evident. The top of the isolation divider is fixed on the top of the unit by means of attachment to a bar or other support structure in the unit box frame.

Figure 3E:
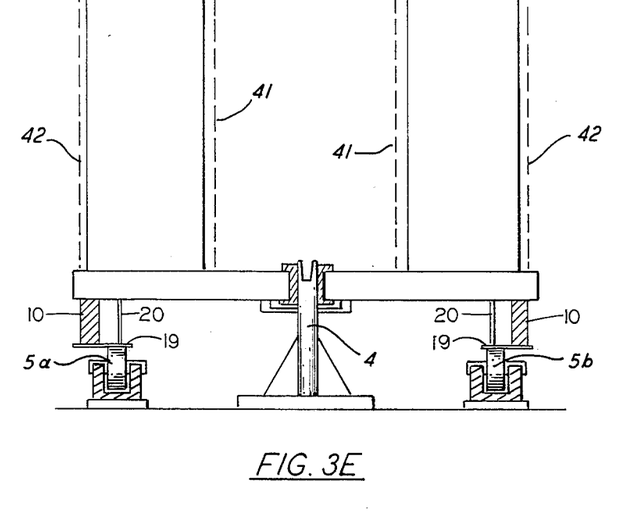
FIG. 3E shows the relationships in cross-section of ratchet means and the lower rotating rim of the bottom carousel ring with respect to the base bearings.

With reference to cross section FIG. 3E in the assembled unit, the carousel center axis is mounted over base bearing 4 and the beds rotate within the ring defined by inner and outer circumferences 41 and 42. In FIG. 3E, the relationship of the bearings to the retainer ring and ratchet engaging means is also shown. The rotation track for the top portion of the rotatable carousel ring may be secured by a wheel or bearing system in which the top portion of the ring is rotatable within the circular area defined by a series of spaced bearings.

Figure 4:
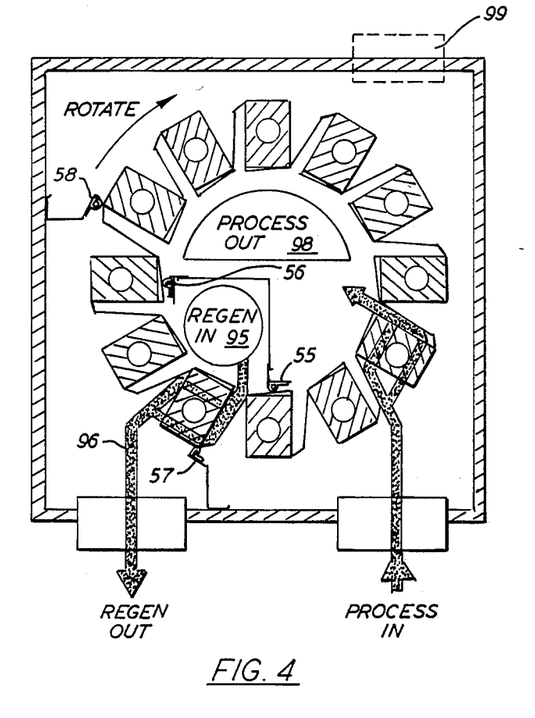
FIG. 4 is a cross-section view showing the operative relationship of the carousel, the divider means on the carousel ring which separate the modular vertical beds, and the central isolation divider. The pattern of fluid flow in the apparatus is shown in reference to the carousel embodiments of FIGS. 3A-3E.

In the preferred embodiment, each bed is slightly offset (approximately 3 degrees) from a true radial orientation with respect to the carousel center. The offset of the bed allows gradual sealing engagement of the beds in the carousel ring as the carousel is shifted bed by bed in the rotational cycle. Such a manner of seal with respect to the bed and carousel ring shown in FIGS. 3A-3E is more clearly depicted in a cross sectional top view of an apparatus shown in FIG. 4, in which the vertically disposed sealing gaskets which separate the process and regeneration chamber are respectively shown at 55, 56, 57 and 58. In this arrangement having a top inlet for regeneration air flow shown at 95, heated desiccant regeneration air is passed from the inside of the carousel ring, through the beds in the regeneration section and out as indicated by the arrow depicting regeneration air flow. The process air flow, represented by arrow 97 is countercurrent to the regeneration air flow, from the outside of the carousel to the inside of the carousel and consequently to the process outlet 98. Other process outlets such as depicted at 99 in FIG. 4 may also be provided in the side walls of the unit as optionally desired. While the air flow shown in FIG. 4 is a standard arrangement for units with a heat recovery system, the directional air flow may also be oppositely directed as to each sector allowing for flexibility and convenience if a gas fluid or steam reactivated system is used.

the desiccant beds from the carousel. In addition, an efficient desiccant recharging procedure may be utilized since each modular bed section has both a fill hole at the top and a drain hole at the bottom. It is not necessary to remove beds, disturb seals, or otherwise upset a proper mechanical package during the recharging operation.

In the invention, an activator means cylically rotates the relationship of the carousel and the beds around a central axis, with respect to a sector isolation means. At each thrust of the activator after at a predetermined time interval, the carouse is rotated a predetermined angular segment of a circle. In this manner (1) an individual modular bed on the carousel ring is shifted to the regenerating condition from the process condition and (2) a bed in the regenerating condition is shifted to the operative process condition. The proportional number of beds in the regenerating stage with respect to the total number of the beds on the carousel is determined by the design dwell time for regeneration required in a particular application.

Because the modular beds which are used are radially mounted on a carousel ring, it is also possible to achieve a major decrease in physical size of the unit as compared to a comparable capacity unit with a concentric screen drum design. As capacity of the unit increases, the geometric arrangement of the desiccant containing beds in the modular carousel greatly reduces the physical size of the unit in comparison with a unit of the same capacity using a concentric screen drum design. For example, a carousel dehumidifying unit of the invention which is 100 inches in diameter may include a number of modular vertical beds radially disposed, which in the aggregate are equivalent in desiccant capacity to the capacity of a 192 inch diameter concentric screen drum unit.

Figure 1:
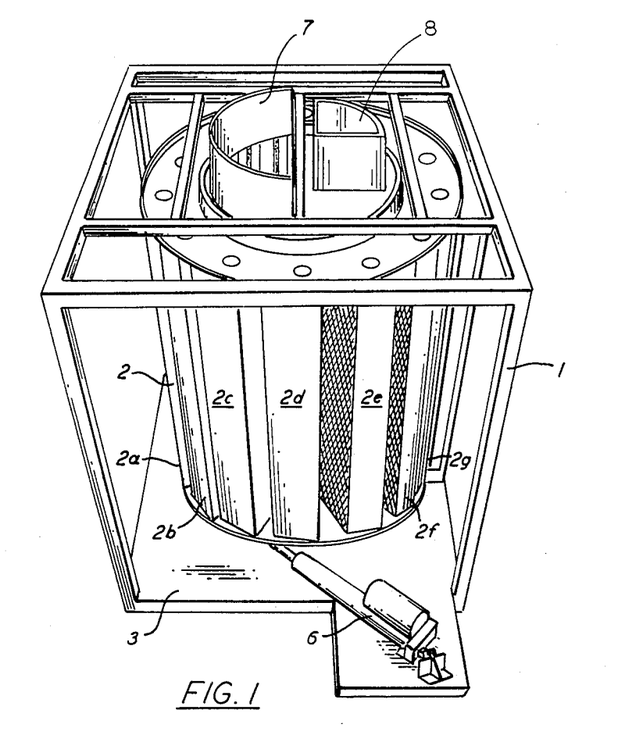
FIG. 1 is a perspective view, of a dehumidifying unit from the front and above, showing the structural elements of the apparatus with the confining side and top enclosures for the unit removed.

With respect to FIG. 1, the rotating carousel ring unit having the modular desiccant bed system of the invention is shown in its assembly relationship with a structural housing. The enclosing side and top paneling segments of the unit cabinet are removed. In the FIG. 1 apparatus, a box frame 1 is provided in which the rotatable carousel ring 2 having a plurality of modular desiccant beds (2a through 2g as visible in the drawing) is contained. The beds are essentially radially disposed at the outside circumference of the carousel ring. A base 3 is provided, and as shown in base plan FIG. 1A, a central axle 4 and multiple bearings and support means, 5a, 5b, 5c and 5d upon which the carousel rests, and revolves, are provided on the base. Also included on the base shown in FIG. 1 is a linear actuator means 6 for selective co-operative engagement with means on the carousel ring to provide rotational movement of the carousel ring about the axis at predetermined time intervals to shift the beds in the process to reactivation to process operating cycle. A guide and control means 6a to direct and control the thrust of the actuator with respect to the carousel is also provided. Duct means for directing air flow in the interior sections of the carousel are shown at 7 and 8. The duct means for directing air flow with respect to the outer section of the carousel are provided on the sidewalls of the enclosing box frame as will be evident from the further description provided. A further isolation means, not visible in FIG. 1 is in the interior of the carousel ring and operatively isolates sections of the carousel including a number of the individual beds between process and regeneration modes.

In a general embodiment, the rotatable carousel ring has locations for a plurality of modular desiccant beds which vertically form a "ring" structure. The ring is shown in the top plan, bottom plan, and side elevation views in FIGS. 2A and 2B and 2C. The ratchet engagement mechanism on the ring which cooperates with the linear actuator for selective rotation of the modular desiccant beds with respect to the dehumidifying and regeneration modes of operation is shown in perspective in FIG. 2D. A cross section of the carousel ring and desiccant bed system showing the carousel ring isolation system for each bed is shown in FIG. 2E.

In the series of FIGS. 2A through 2E, it is seen that a ring support is provided to form the carousel on which the individual modular desiccant beds are essentially radially disposed in a vertical array. While bed locations on the carousel ring, for 12 modular beds are shown between the inner ring circumference and outer ring circumference in FIGS. 2A-2E, the apparatus of the invention may include more or fewer modular beds in the carousel ring depending upon design criteria. Typically, however, from 12 to 32 beds with a bed thickness of 4 inches included on a ring will be appropriate for most industrial applications in which unit capacities in the range of from 500 to 50,000 cubic feet per minute of air flow are required, assuming a cycle time of 80 minutes for one complete revolution for the carousel ring.

Figure 1A:
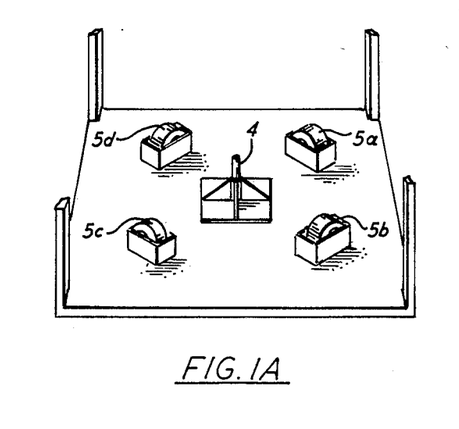
FIG. 1A shows the base plan for the unit.
Figures 2A, 2B, 2D:
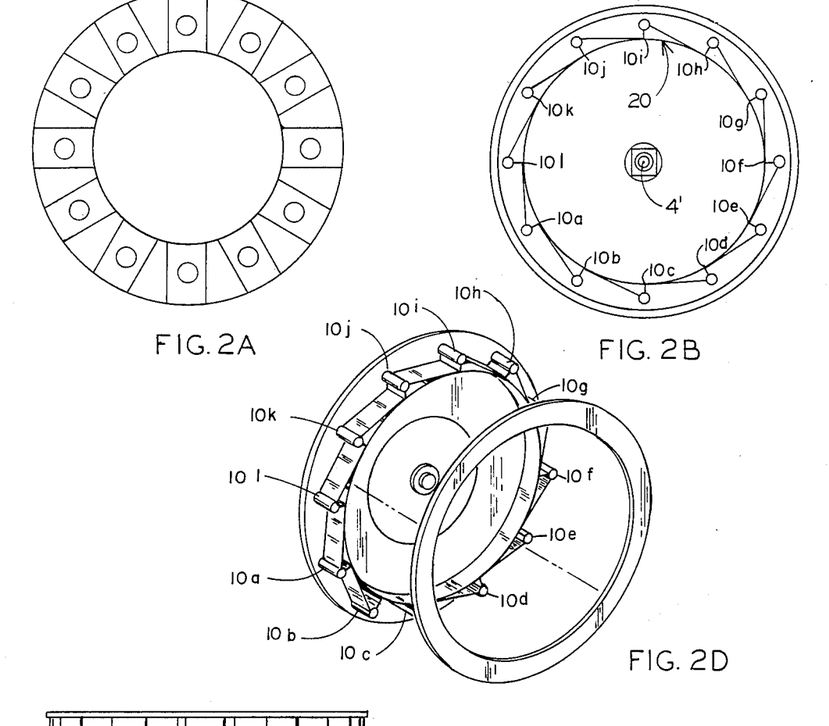
FIGS. 2A and 2B are plan views, respectively, from above and below showing the operative relationship of the carousel top and bottom sections.
FIG. 2D shows the bottom section of the carousel, in perspective, depicting means engagable with the linear actuator which rotates the carousel and a bottom rim.
Figure 2C:
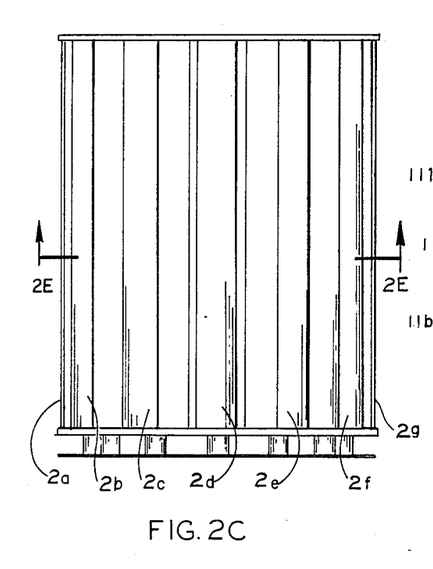
FIG. 2C is a front elevation view of the carousel showing the plurality of modular vertical beds.
Figure 2E:
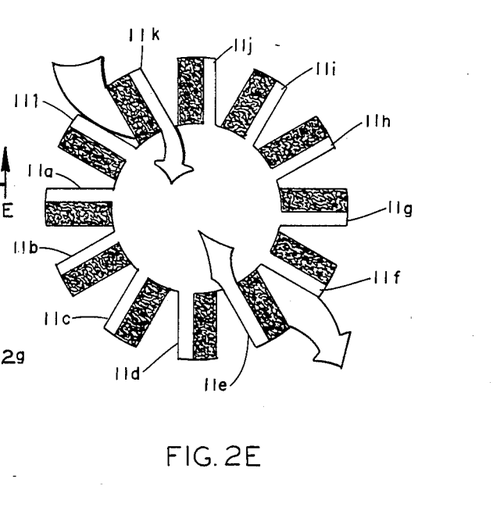
FIG. 2E is a cross-section of a carousel bed configuration.

The bottom of the support base for the carousel is shown in FIGS. 2B and 2D, showing center bearing 4' which mounts the carousel on base axle 4 (shown in FIG. 1A). Concentrically disposed around an inner circumference of the carousel base are a series of stepped ratchet engaging means (one per bed) such as indexing pins 10a through 10l which are engageable with the linear actuator and correspond essentially in location to the locations of the modular desiccant beds of the carousel. Ring 19, spaced from the carousel by the ratchet means, structurally reinforces the ratchet means and also provides the bottom surface on which the outer perimeter of the carousel rests upon the bearing means, 5a-5d, on the base. An additional support ring 20 is also provided between the carousel base and ring 19 and provides a firm and secure base to which ratchet reinforcing means may be attached. Support ring 20 is a standing ring which also carries the load of the carousel as it rotates upon the bearings.

Vertically disposed between the top and bottom of the carousel are angular dividers which extend from the outer radial segment of a desiccant bed to the inner radial segment of the adjacent bed. In this respect the multiple beds are essentially "ganged" with respect to the air flow introduced from either the outer circumference or the inner circumference of the carousel. The relationship of the angular dividers of the beds is more particularly shown with reference to the central cross section of the carousel depicted in FIG. 2E where the dividers are indicated by reference numerals 11a through 11l. With reference to FIG. 2E, it can be seen that air flow through the beds is preferably through the two opposite sides of the bed which are essentially radially disposed on the ring.

It is evident that the physical relationship of the modular vertical beds to the carousel ring may take several forms. FIGS. 3A and 3B show a preferred bed mounting system.

In FIG. 3A, an individual desiccant bed is shown essentially comprising a vertically extended rectangular An alternative, though less preferred arrangement of the sector divider and sealing means is depicted in the sequence of FIGS. 5A, 5B, 5C and 5D in which it is seen that the relationship of the beds to the carousel ring is essentially the opposite of that of the preferred embodiment. In this alternative, each bed includes a gasket seal vertially extending on the inner and outer facing surface thereof and a sector divider means is provided as in FIG. 5C in which concave and convex surfaces are gradually engageable respectively with the outer and inner gaskets on the vertical beds in the ring.

Figure 5A:
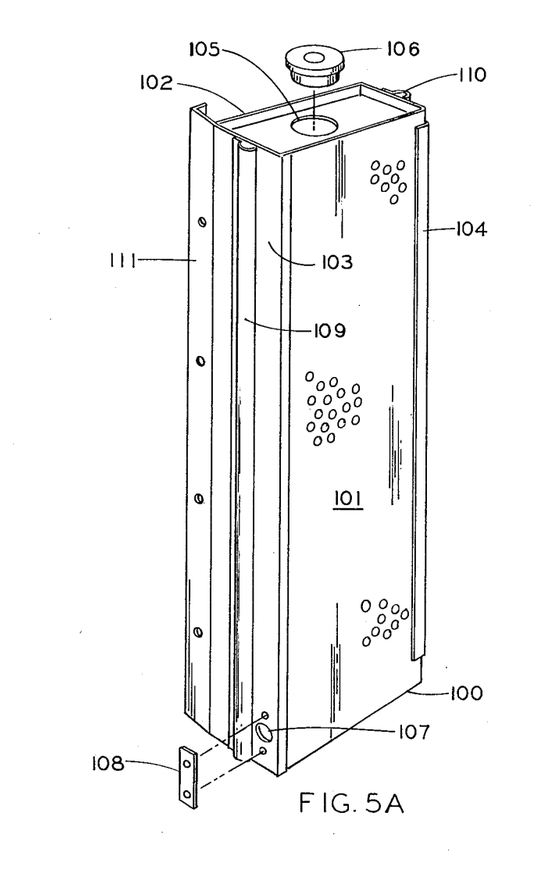
FIGS. 5A-5D show the configuration of an alternate carousel ring and bed isolation system.
Figure 5B:
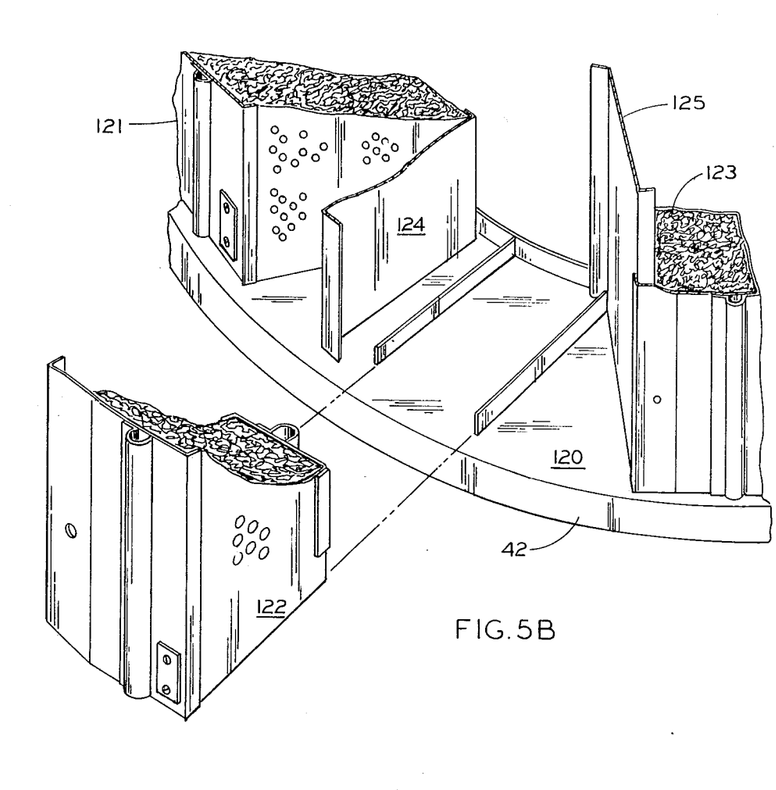
Figure 5C:
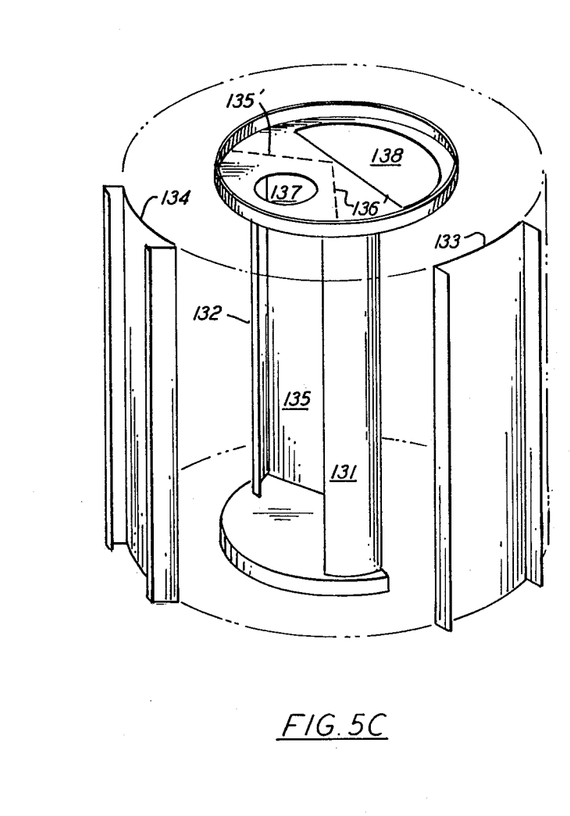

In FIG. 5A, a modular bed 100 is shown with parallel air permeable sides 101 and 102 and inward and outward facing air impermeable sides 103 and 104. A fill hole 105 and cap 106 is provided as well as emptying hole 107 and cover plate 108. Gaskets 109 and 110 extend vertically along the inward and outward sides and the outwise side also includes a lip 111, which may be integral with side 103. FIG. 5B shows a ring segment 120 with location for adjacent beds 121, 122 and 123 which are separated and operatively isolated by adjacent vertical dividers 124 and 125 associated with each bed. Isolation of the process and regeneration sectors in a carousel having such types of beds is accomplished by the means shown in FIG. 5C wherein inner circumference convex surfaces 131 and 132 and outer circumference 133 and 134 are respectively gradually engageable with the vertically extending inner and outer gaskets on the individual beds to provide gradual sealing engagement of the beds to isolate the beds in the regeneration section. The solid walls which isolate the sector, one of which is visible at 135, are vertically disposed at locations 135' and 136' shown in FIG. 5C. Ducts providing access to the regeneration sector and process sector are respectively shown at 137 and 138.

Figure 5D:
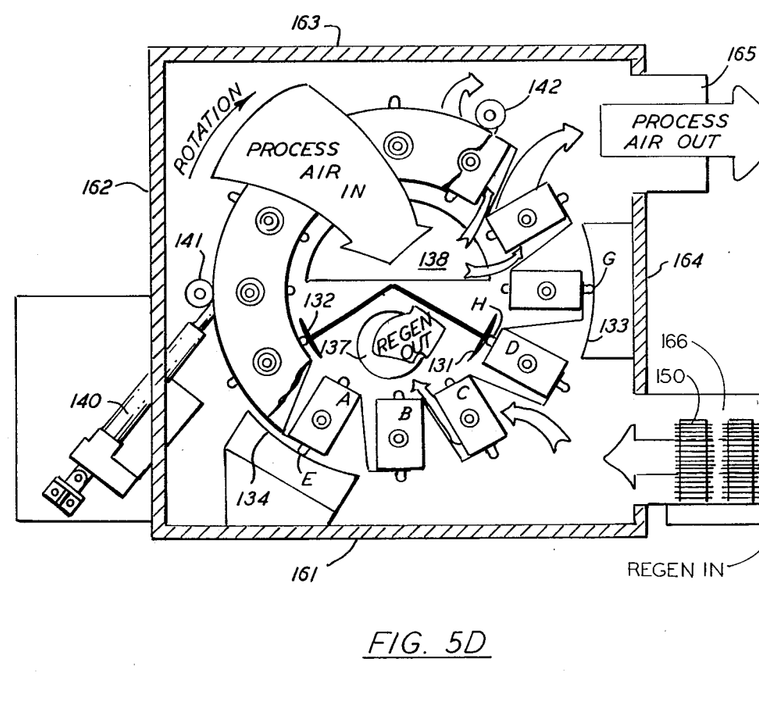

A view from the top of such a unit in operation is shown in FIG. 5D, additionally showing activator means 140 and the locations for guide wheel or guide bearing means at 141 and 142 with respect to the top of the carousel ring for maintaining the top of the ring in a fixed circular location. The guide wheels are preferably opposite the regeneration sector isolation seal and essentially are in rolling contact with the upper rim of the carousel and provide sufficient directional force to maintain the gaskets on the beds in contact with the outer sealing means 133 and 134. (The bottom of the carousel is fixed by reason of the axle which engages a bearing at the center thereof.) A heater for regeneration air flow is shown at 150. The sides of the unit providing an air tight enclosure are also shown at 161, 162, 163 and 164, and the respective duct means presenting air flows to the outer circumference of the carousel ring are shown at 165 and 166 although other locations are possible. In FIG. 5D it is thus seen that the beds indicated as A, B, C and D are all each isolated in the regeneration sector of the unit. The gasket seals operative on the beds to isolate the sector are shown at E, F, G and H. The fixed location at the top of the unit for providing the wheel or bearing system to maintain the carousel in a circular rotation are shown at 160 and 161.

Figure 6A:
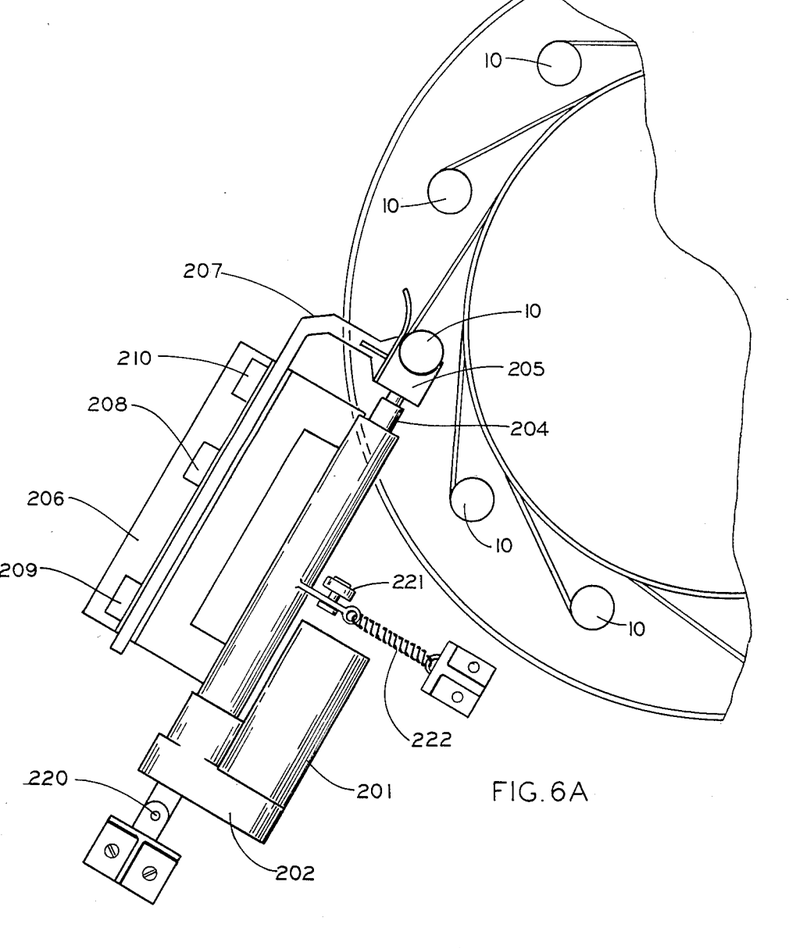
FIGS. 6A and 6B show a detail of the linear actuator means and the carousel engagement means at the bottom of the carousel ring, which co-operate to rotate the bed carousel.
Figure 6B:
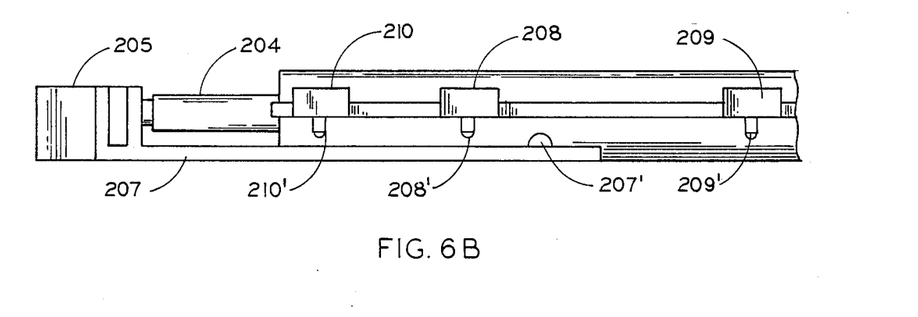

In the preferred embodiment, a timer is utilized to control operation of a linear actuator which provides stepwise rotational movement of the carousel with respect to the modular beds, i.e., the activator will rotate the carousel a predetermined number of degrees to shift one bed from the process chamber to the reactivation chamber and one bed from the reactivation chamber to the process chamber after a predetermined time interval. The shift is a quick pushing thrust which has an insignificant time duration when compared to the nominal dwell time of the beds between shifts. The appropriate dwell time during which a desiccant bed is maintained in the reactivation chamber is a matter of design consideration related to the application environment of a particular unit. An actuator is shown in FIGS. 6A and 6B in which the actuator thrust means is selectively engageable with the ratchet means provided at the bottom of the carousel. The preferred actuator is a conventional commercial item known as an electromechanical linear actuator. With reference to FIG. 6A, the actuator means used in the apparatus includes a motor 201, which drives reduction gearbox and clutch means 202, and is in turn engaged with a screw and a thrust rod 204 which provides a "push-pull" force. Used in conjunction with the carousel desiccant bed, however, the thrust rod includes a further "U" shaped engagement means 205 for engagement with the "teeth" of the ratchet configuration provided at the bottom of the carousel corresponding to the location of each modular vertical bed. The pushing thrust of the actuator is predetermined to shift the carousel in rotation with respect to the isolation sector seal, one bed per thrust. For example, in a twelve bed unit, twelve thrusts of the activator, at predetermined time intervals, will provide in stepwise fashion one complete rotation of the carousel with respect to a given bed. With reference to FIG. 6A mechanically operable index switches are also provided along the length of a fixed control arm, shown at 206.

A corresponding moveable index arm 207 is attached to the thrust arm and moves in a linear corresponding relationship to the actuator. The index switches which determine on/off control of the actuator in respect to linear movement include an index completion switch 208, which indexes the actuator to rotate the carousel through the predetermined angular segment and provides an electrical signal to return the actuator to the beginning position for the next thrust. Return switch and actuator shut off 209 indexes the beginning location of the thrust. An emergency shut down switch 210 is provided to prevent the actuator from exceeding a predetermined push distance and will prevent damage to the unit in the event of failure of index switch 208. A side elevation view of the actuator and index control switch is shown in FIG. 6B wherein the switch engaging means on the fixed and slideable index arms are indicated as 208, 209 and 210.

To permit accurate alignment of the linear movement of the actuator with respect to the circumferential ratchet means on the carousel base, one end of the actuator is rotatable a small degree about an axle (or hinge) such as is shown at 220 in FIG. 6A and a caster, bearing or other rolling and support means is applied to the other end of the actuator as shown at 221 and a spring 222 provides sufficient force to maintain engagement of the activator with the carousel ratchet.

As noted, the modular vertical bed system will generally consist of from 12 to 32 independent rectangular bed sections separated by dividers mounted vertically in a circular ring arrangement. In dehumidifying units with airflow capacities ranging from about 500 to 50,000 cubic feet per unit and containing from about 3 to 300 cubic feet of dessicant capacity, in beds having a thickness between air permeable sides of approximately 4 inches, the approximate design cycle time to complete one revolution of the carousel is about 80 minutes when a silica gel disiccant is used.

Several methods are useful to modulate or to control the level of the moisture removal capacity in the efficient utilization of the invention. While the specific application usually dictates the appropriate method, there are some situations in which an optimum approach may involve a combination or variation of the four methods described below:

(1) On/off control of the entire dehumidifier: Both process and reactivation air flows are turned on and off using a humidistat or dewpoint sensor to monitor the return air to the dehumidifier. This control procedure typically is used with the system whenever the dehumidifier is installed as an independent unit and is not tied into a make-up or air circulation system.

(2) On/off control of the reactivation heaters and blower. The independent air flow design of the unit eliminates the need to maintain a system balance of process and reactivation air flows as is required with typical flat bed dehumidifier designs. It is an inexpensive method of control to install; however, the effluent process air will tend to have greater variation in moisture content or dewpoint than will be the case with units controlled by other means.

(3) Modulation of reactivation heat. The supply of energy to the reactivation heaters by step or proportional controllers, an SCR, or by adjustment of the number of heating elements being energized will allow control of the reactivating heat source. This modulation of the reactivation temperature input to the dehumidifier allows a uniform effluent process condition to be maintained within a close tolerance. The consumption of energy is also minimized by the system's inherent effort to supply only the minimum reactivation energy required to satisfy the controlled space humidistat or dewpoint sensor.

(4) Modulation of reactivation heat and air volume. This approach uses the reactivation air volume as the primary automatic variant. When used, the desired reactivation temperature is held to a specific value automatically as determined by design requirements, desiccant types, or other variables known to those of skill in the art. This method extends the range of reactivation capability; can be used over a wide range of operating conditions; and compensates automatically for reductions in the adsorption capacity of the desiccant.

In typical applications, the most suitable superficial face velocity through the desiccant beds is 80 feet per minute. Lower velocities (in the 40 to 60 feet per minute range) maximize moisture removal and produce the lowest moisture content in the processed air on an absolute measurement scale independent of temperature. Higher velocities (in the 80 to 100 feet per minute range) improve the efficiency of the unit by increasing the pounds of water removed per kilowatt of energy consumed. However, the resultant pressure drop through the bed may be excessively high. Regeneration temperature of 250° to 275° F. is a typical value when using silica gel, activated alumina, or alumina gels. If a process outlet dewpoint below a 0° F. dewpoint is required, it usually is necessary to have a regeneration temperature in the 275° to 300° F. range. Significantly higher regeneration temperatures, in the 325° to 375° F. range, are needed when using molecular sieve desiccants. Also typical is that a reactivation air volume equal to 25 percent of the total process and reactivation air volume is usually sufficient. If entering moisture levels greater than 50 grains per pound are encountered, it is necessary to increase air volume to maintain performance. Under extreme conditions, it may be necessary to use as much as 30 to 35 percent of the modular dissicant beds in the reactivation air volume. Further, because the unit features an air tight design, the planned or incidental pressure differentials across the dryer should be considered and a pressure differential greater than 5" $H_2O$ should be avoided.

Thus described the unit of the invention provides advantages over the prior art: (1) In comparison to continuous rotation in a flat bed, the carousel ring permits rapid transfer of desiccant from one phase to another; movement of a bed through the difficult transition zone is a rapid thrust; (2) The sector seals in the carousel bed unit never contact the perforated bed screens. Because the bed perforations can be rough and may contain fragments of desiccant, the problem of abrasion which greatly accelerates the deterioration of the silocone seal materials in prior art units is avoided; (3) Adjustment of adsorption to regeneration areas relationships is simplified by the placement of the vertical partitions in the inner and outer sections of the carousel ring; (4) Reduction of carousel diameter is afforded by increasing the depth of the individual bed segments while maintaining their uniform thickness as the unit size is increased; and (5) Countercurrent air flows are possible, in contrast with the open bed structure used in flat bed designs which must operate as a co-current system.

While I have set forth a description of the preferred embodiment utilizing specific directional references such as "vertical" and the like and have referred to "quadrant" sections of the carousel, it is evident that other spatial orientations and relationships of the elements of the apparatus will be apparent. Other equivalent means to provide modular isolation of the beds and sectional division of the process and regenerating sections and means for stepwise rotation of the carousel may also be apparent given the foregoing description. For example, the regeneration sector isolation divider may be rotatable with respect to the inner and outer circumferences of a fixed ring in an operating relationship which is essentially the reverse of that described herein. Thus, the description is illustrative rather than limiting as to the number of the embodiments to which the invention may be adapted and it is not intended to exclude such other variations which may be adopted from the foregoing description of the preferred embodiment.

What is claimed is:

1. In a dehumidifying apparatus in which a desiccant medium is cyclically shifted between an operating active process condition and a regenerating condition, the improvement including:
   (1) A carousel ring having a plurality of essentially identical modular desiccant beds being disposed substantially parallel to, and perpendicular to the ring axis, each of said beds being physically separate from the others and containing a desiccant medium and having a pair of air permeable sides which permit the flow of air in a radial direction with respect to the ring from one side of the bed to another side through the desiccant, said modular beds being disposed essentially radially in the ring between the outer circumference of the ring and an inner circumference of the ring;

(2) Divider means for operatively separating the modular beds of the ring from each other; said divider means disposed with respect to the inner and outer circumference of the ring in a relationship with respect to the beds so that one permeable side of each bed is operatively disposed towards the outer circumference of the carousel and the other permeable side of the bed is operatively disposed towards the inner circumference;

(4) Fixed isolation means cooperatively engageable with the dessicant beds on the ring for operatively segregating a predetermined number of modular beds on the ring from the other beds on the ring, to provide a first isolated class of air process beds upon the ring in which the bed desiccant is active and a second isolated class of beds upon the ring in which the bed desiccant is in a regenerating condition, said isolation means;

(A) being operatively disposed with respect to positions of the carousel at the inner circumference thereof and the outer circumference thereof to define separate operating sections in the apparatus for the radial flow of air through the beds in each respective class; and (B) being further operatively disposed with respect to gradually engageable longitudinally extending sealing means which are axially disposed between the beds on the carousel ring and said isolation means in a correspondence with the separate operating sections; and (5) Activator means for intermittently rotating the carousel ring with respect to the fixed isolation means about a predetermined angular segment around the axis of the carousel at a predetermined time interval, to shift a bed in the first class of active air process beds to the regenerating condition, and to shift a bed in the class of beds in the regenerating condition to the active condition.

2. The apparatus of claim 1 including further means for radially directing a flow of regeneration air to the class of regenerating condition beds in a direction which is countercurrent to the radial flow of air through the beds while the beds are in the air process condition.

3. The apparatus of claim 1 in which the activator means is an electromechanical linear actuator which is cooperatively engageable with circumferentially disposed ratchet means located on the ring at predetermined intevals.

4. The apparatus of claim 3 in which the ratchet means on the ring includes a ratchet tooth index means on the carousel in a correspondence with each bed location on the ring.

5. The apparatus of claim 4 including an indexing means for the linear actuator for correlating the thrust of the linear actuator with respect to the ratchet means of the ring to provide a degree of rotation of the carousel in a proportional correspondence in which the proportional angular rotation of the carousel per thrust is essentially equivalent to a 360° rotation of its bed divided by the number of beds on the ring.

6. The apparatus of claim 1 in which the gradually engageable sealing means includes gasket means disposed with respect to the inner and outer circumference of the ring in a correspondence with a predetermined number of beds on the ring, whereby an essentially smooth surface of the bed is gradually engageable with the gasket.

7. The apparatus of claim 6 in which the beds on the carousel ring include a relatively plane surface facing the outer ring circumference engageable with the gasket means, said outside surface being slightly offset to provide at the outside ring circumference an angle less than 90° with respect to the relationship of the surface to a perpendicular line extending from the radius of the carousel.

8. The apparatus of claim 1 in which the beds include gasket means extending along the length of the carousel ring on each bed at the inner and outer circumference thereof and the isolation means includes a fixed gradually engageable smooth surface which with the gasket means on the circumference sides of the beds are engageable.

9. The apparatus of claim 1 in which the beds are parallelepiped in shape and in which the two air permeable sides of the bed are essentially radially disposed with respect to the axis of rotation of the carousel.

10. The apparatus of claim 9 in which the dividers which physically separate the beds in the ring connectingly seal the corners of the adjacent beds from the inner circumference of the carousel ring to the outer circumference of the ring.

11. The apparatus of claim 10 in which the two air impermeable sides of the parallepiped beds respectively face the inner and outer circumference of the ring.

12. The apparatus of claim 11 in which at least the air impermeable side of the bed facing the outer circumference of the ring is offset approximately 3° less than perpendicular from a perpendicular line extending from a radius of the carousel, whereby the side of the bed facing the outer circumference is gradually engageable with the sealing means with respect to the direction of rotation of the carousel.

* * * * *